United States Patent
Pronin et al.

(10) Patent No.: US 12,046,866 B2
(45) Date of Patent: Jul. 23, 2024

(54) APPARATUS AND METHOD FOR MULTIPLE FREQUENCY COMB GENERATION AND APPLICATIONS THEREOF

(71) Applicants: Max-Planck-Gesellschaft zur Foerderung der Wissenschaften e. V., Munich (DE); Ludwig-Maximilians-Universitaet Muenchen, Munich (DE)

(72) Inventors: Oleg Pronin, Hamburg (DE); Ferenc Krausz, Garching (DE); Ka Fai Mak, Munich (DE); Jonathan Brons, Oberndorf (DE); Maksim Iandulskii, Kiev (UA)

(73) Assignees: Max-Planck-Gesellschaft zur Foerderung der Wissenschaften e. V., Munich (DE); Ludwig-Maximilians-Universitaet Muenchen, Munich (DE)

( * ) Notice: Subject to any disclaimer, the term of this patent is extended or adjusted under 35 U.S.C. 154(b) by 535 days.

(21) Appl. No.: 17/441,750

(22) PCT Filed: Mar. 25, 2019

(86) PCT No.: PCT/EP2019/057458
§ 371 (c)(1),
(2) Date: Sep. 22, 2021

(87) PCT Pub. No.: WO2020/192887
PCT Pub. Date: Oct. 1, 2020

(65) Prior Publication Data
US 2022/0209490 A1    Jun. 30, 2022

(51) Int. Cl.
*H01S 3/1112* (2023.01)
*H01S 3/00* (2006.01)
(Continued)

(52) U.S. Cl.
CPC .......... *H01S 3/1112* (2013.01); *H01S 3/0057* (2013.01); *H01S 3/0604* (2013.01);
(Continued)

(58) Field of Classification Search
CPC ........................... H01S 3/0813; H01S 3/1112
(Continued)

(56) References Cited

U.S. PATENT DOCUMENTS

| | | |
|---|---|---|
| 6,363,090 B1 | 3/2002 | Wintner et al. |
| 10,060,796 B2 | 8/2018 | Bekal et al. |

(Continued)

FOREIGN PATENT DOCUMENTS

| | | |
|---|---|---|
| CN | 104953455 A | 9/2015 |
| CN | 108429123 A | 8/2018 |

(Continued)

OTHER PUBLICATIONS

English Abstract for CN 104953455 A (2015).
(Continued)

*Primary Examiner* — Tuan N Nguyen
(74) *Attorney, Agent, or Firm* — Caesar Rivise, PC

(57) ABSTRACT

A multiple frequency comb source apparatus (100) for simultaneously creating a first laser pulse sequence representing a first frequency comb (1) and at least one further laser pulse sequence representing at least one further frequency comb (2), wherein at least two of the first and at least one further pulse sequences have different repetition frequencies, comprises a laser resonator device (10) comprising multiple resonator mirrors including first end mirrors $EM_1, OC_1$ providing a first laser resonator (11), a laser gain medium (21, 22) being arranged in the laser resonator device (10), and a pump device (30) being arranged for pumping the laser gain medium (21), wherein the laser resonator device (10) is configured for creating the first and at least (Continued)

one further laser pulse sequences by pumping and passively mode-locking the laser gain medium (21), the resonator mirrors of the laser resonator device (10) include further end mirrors $EM_2$, $OC_2$ providing at least one further laser resonator (12), the first laser resonator (11) and the at least one further laser resonator (12) share the laser gain medium (21), resonator modes of the first laser resonator (11) and the at least one further laser resonator (12) are displaced relative to each other, wherein the resonator modes are located in the laser gain medium (21) at separate beam path spots, and at least one of the first and further end mirrors $EM_1$, $EM_2$, $OC_1$, $OC_2$ is adjustable so that the repetition frequency of at least one of the first and at least one further laser pulse sequences can be set independently from the repetition frequency of the other one of the first and at least one further laser pulse sequences. Furthermore, a spectroscopic measuring method, a spectroscopy apparatus and a multiple frequency comb generation method are described.

41 Claims, 3 Drawing Sheets

(51) Int. Cl.
*H01S 3/06* (2006.01)
*H01S 3/081* (2006.01)
*H01S 3/094* (2006.01)
*H01S 3/131* (2006.01)
*H01S 3/16* (2006.01)

(52) U.S. Cl.
CPC .......... *H01S 3/0811* (2013.01); *H01S 3/0813* (2013.01); *H01S 3/094061* (2013.01); *H01S 3/1312* (2013.01); *H01S 3/1618* (2013.01); *H01S 3/1623* (2013.01); *H01S 3/1643* (2013.01)

(58) Field of Classification Search
USPC .......................................................... 372/18
See application file for complete search history.

(56) References Cited

U.S. PATENT DOCUMENTS

| | | | |
|---|---|---|---|
| 10,297,974 | B2 | 5/2019 | Udem et al. |
| 2007/0002907 | A1 | 1/2007 | Ell et al. |
| 2012/0200912 | A1 | 8/2012 | Hodgson et al. |
| 2012/0250719 | A1* | 10/2012 | Hodgson .................. H01S 3/04 372/70 |
| 2017/0310072 | A1 | 10/2017 | Link et al. |
| 2018/0216996 | A1 | 8/2018 | Kieu |
| 2019/0301933 | A1* | 10/2019 | Allison ................ G01N 21/636 |

FOREIGN PATENT DOCUMENTS

| | | | |
|---|---|---|---|
| DE | 19634489 | A1 | 3/1998 |
| WO | 2018152594 | A1 | 8/2018 |

OTHER PUBLICATIONS

Office Action of CN App 201980094642.3, dated Dec. 4, 2023.
Machine Translation for DE 19634489 A1 (1998).
Brons et al. (2016). Powerful 100-fs-scale Kerr-lens mode-locked thin-disk oscillator. Optics Letters, 41(15), 3567-3570.
Coddington et al. (2016). Dual-comb spectroscopy. Optica, 3(4), 414-426.
Dykaar et al. (1993). Sticky pulses: two-color cross-mode-locked femtosecond operation of a single Ti:sapphire laser. Optics Letters, 18(8), 634-636.
Link et al. (2015). Dual-comb modelocked laser. Optics Express, 23(5), 5521-5531.
Liu et al. (2014). Dual Ti:sapphire comb lasers by a fiber laser pumping scheme and a hand-sized optical frequency reference. Appl. Phys. B, 117, 699-705.
Lomsadze et al. (2018). Tri-comb spectroscopy. Nature Photonics, 12, 676-680.
Schiller. (2002). Spectrometry with frequency combs. Optics Letters, 27(9), 766-768.
Schliesser et al. (2005). Frequency-comb infrared spectrometer for rapid, remote chemical sensing. Optics Express, 13(22), 9029-9038.

* cited by examiner

APPARATUS AND METHOD FOR MULTIPLE FREQUENCY COMB GENERATION AND APPLICATIONS THEREOF

CROSS-REFERENCE TO RELATED APPLICATIONS

This application is a U.S. National Phase Application of PCT/EP2019/057458, filed Mar. 25, 2019, the content of which application is incorporated herein by reference in its entirety for all purposes.

FIELD OF THE INVENTION

The invention relates to a multiple frequency comb source apparatus and a multiple frequency comb generation method for simultaneously creating at least two laser pulse sequences having different repetition frequencies, like e. g. a dual frequency comb source apparatus and a dual frequency comb generation method. Furthermore, the invention relates to applications of the multiple frequency comb source apparatus and the multiple frequency comb generation method, e. g. in dual comb spectroscopy. In particular, the invention further relates to a spectroscopy apparatus including the multiple frequency comb source apparatus and a spectroscopic measuring method employing the multiple frequency comb generation method.

TECHNICAL BACKGROUND

In the present specification, reference is made to the following prior art illustrating the technical background of the invention:
[1] S. Schiller in "Optics Letters" 27(9), 766-768 (2002);
[2] A. Schliesser et al. in "Optics Express" 13, 9029 (2005);
[3] I. Coddington et al. in "OPTICA" 3, 414-426 (2016);
[4] U.S. Pat. No. 10,060,796 B2;
[5] US 2018/0216996 A1;
[6] T.-W. Liu et al. in "Appl. Phys. B" 117, 699-705 (2014);
[7] US 2017/310072 A1;
[8] S. M. Link et al. in "Opt. Express" 23, 5521-5531 (2015);
[9] D. R. Dykaar et al. in "Opt. Lett." 18, 634-636 (1993);
[10] B. Lomsadze et al. in "Nature Photonics" 12 676 680 (2018);
[11] J. Brons et al. in "Opt. Lett." 41, 3567-3570 (2016);
[12] U.S. Pat. No. 6,363,090 B1;

It is generally known to employ Fourier-transform spectroscopy (FTS) for investigating samples in the middle-infrared (MIR) spectral region. The FTS spectrometer includes a Michelson interferometer with an oscillating mirror being movable with a delay line and a broadband light source emitting a spectrum of wavelengths to be measured in the interferometer. A sample is arranged in one of the two arms of the interferometer. As the delay is scanned, the output signal of a detector forms an interferogram, which is subjected to a Fourier transformation for obtaining a sample spectrum. FTS spectrometers have disadvantages in terms of the achievable spectral resolution, which strongly depends on the delay line in the Michelson interferometer, the acquisition time of the measurement and the size of the experimental setup. In particular, these disadvantages hinder applications of FTS in research on, for example, fast non-repetitive processes that are important in biology.

A promising approach for overcoming the disadvantages of FTS spectrometers that provides exceptionally high resolution is based on using so-called frequency comb sources.

A frequency comb source (sometimes indicated as a frequency comb) is a radiation source that emits multiple equally-spaced frequencies. Multiple frequencies with equal frequency spacing in frequency domain correspond to a pulse sequence in time domain, typically sequence of laser pulses, with a repetition frequency equal to the frequency spacing. Two frequency combs with slightly different repetition frequency offset can be used for replacing the interferometer in the conventional FTS approach. This method is often referred as "dual frequency-comb spectroscopy" (see e. g. [1], [2]). It allows high acquisition speed in the milli- or even micro-seconds while maintaining the high spectral resolution. The resolution and acquisition time using this method depends mostly on the repetition frequencies of the two frequency combs.

However, there are numerous challenges in the development of dual-comb laser systems. A first problem relates to the need for long term stability between the two frequency combs, e. g. during a measuring application. Most demonstrations thus far are based on frequency combs generated in separate resonators, meaning active stabilization techniques are needed to ensure both combs maintain their coherence and frequency offsets with respect to each other [3]. Alternatively, complicated post-processing methodologies are used, as described e. g. in [4]. Furthermore, devices that attempt to provide two outputs with low jitter between the two combs, such as disclosed in [5], have repetition frequencies that cannot easily be adjusted.

A second problem lies in the limited output power of conventional dual comb systems. Due to the lack of suitable laser material, conventional frequency combs cannot easily be generated in many wavelength regions that are rich in spectral features, such as in the MIR or extreme-UV. These spectral regions can in principle be covered by nonlinear frequency conversion, but this requires a high power comb source.

Influences of pumping noise and resonator instabilities on the long term stability of the two frequency combs can be reduced by employing a common pump source for two frequency combs and sharing some optical components of the frequency comb resonators for creating the laser pulse sequences [6]. However, because of using separate resonators and separate gain media, this approach has only restricted capability of improving stability of dual frequency combs.

A dual frequency comb using a single pump source and sharing a common resonator and a common gain medium is disclosed in [7] and [8]. With this technique, an intracavity birefringent crystal within the common resonator is used to generate the two combs. Due to different refractive indices being effective for light with different polarizations, laser pulse sequences with different repetition frequencies are created, which represent the different frequency combs. The main limitation of this approach is a restricted adjustability of the frequency combs, as the repetition frequencies can be changed within a narrow range only and they cannot be changed independently from each other. Additionally, intracavity birefringent crystals may not be compatible with high intra-cavity average and peak powers and, thus, not power scalable.

According to [9], two-color cross-mode-locked femtosecond operation of a single Ti:sapphire laser is described, wherein two laser resonators share two resonator mirrors and a Ti:sapphire crystal as a common gain medium, while end mirrors of the laser resonators are displaced relative to each other. The laser resonators are constructed such that two independent mode-locked lasing modes are closed to each other so that they interact and the laser pulse sequences are locked (cross-mode lock) with a common repetition frequency. [9] also describes that a thermal drift of repetition frequencies occurs without the cross-mode lock. Accordingly, the Ti:sapphire laser of [9] cannot provide a reproducibly stable dual comb source with predetermined different repetition frequencies.

There is not only an interest in stable dual comb sources, but generally in multiple comb sources emitting three or more frequency combs with predetermined repetition frequencies with a difference between the repetition frequencies if at least two of the frequency combs. An example of three comb spectroscopy is described in [10]. Multiple comb sources are also of interest for other interferometric techniques, like optical coherence tomography or multi-heterodyne Fourier transform spectroscopy.

Thin-disc lasers are generally known as solid state lasers with a disc-shaped laser gain medium. A laser gain medium with a thin-disc geometry is described e. g. in [11]. An apparatus based on the thin-disc geometry that emits only a single beam of high power radiation has been disclosed e. g. in [12].

OBJECTIVE OF THE INVENTION

The objectives of the invention are to provide an improved multiple frequency comb source apparatus and an improved multiple frequency comb generation method, being capable of avoiding disadvantages of conventional techniques. In particular, multiple frequency combs are to be created with almost identical pulse parameters apart from an adjustable difference in repetition frequencies, e. g. for spectroscopy applications, with improved reproducibility, improved temporal stability and/or with increased power. Furthermore, the objectives of the invention are to provide an improved spectroscopy apparatus and an improved spectroscopic measuring method, being capable of avoiding disadvantages of conventional techniques.

SUMMARY OF THE INVENTION

These objectives are correspondingly solved by a multiple frequency comb source apparatus, a multiple frequency comb generation method, a spectroscopy apparatus and/or a spectroscopic measuring method of the invention.

According to a first general aspect of the invention, the above objective is solved by a multiple frequency comb source apparatus, being configured for simultaneously creating a first laser pulse sequence representing a first frequency comb and at least one further laser pulse sequence representing at least one further frequency comb, wherein at least two of the first and the at least one further pulse sequences have different repetition frequencies. The multiple frequency comb source apparatus comprises a laser resonator device, a laser gain medium and a pump device. The laser resonator device has multiple resonator mirrors including a pair of first end mirrors, which together with at least one of the remaining resonator mirrors provide a first laser resonator. The laser gain medium is arranged in the laser resonator device, i.e. any resonant beam path within the laser resonator device crosses the laser gain medium. The pump device generally is a device for pumping the laser gain medium, so that stimulated emission is excited in the laser resonator. The laser resonator device is configured for creating the first laser pulse sequence and at least one further laser pulse sequence by pumping and passively mode-locking the laser gain medium.

According to the invention, the resonator mirrors of the laser resonator device include further end mirrors, in particular at least one further pair of end mirrors, which together with at least one of the remaining resonator mirrors provide at least one further laser resonator. Each of the first and at least one further laser resonators comprises a resonant cavity with a beam path between the related end mirrors. The laser resonator device comprises at least two different laser resonators having at least one common resonator mirror, preferably sharing all resonator mirrors except of the end mirrors of the different laser resonators.

Furthermore, according to the invention, the first laser resonator and the at least one further laser resonator are configured such that they share the laser gain medium. The laser gain medium is arranged in the laser resonator device, i.e. resonant beam paths of all laser resonators cross the laser gain medium. Resonator modes of the first laser resonator and the at least one further laser resonator are displaced relative to each other, so that the resonator modes are located in the common laser gain medium at separate beam path spots, i. e. cavity spots of the resonator modes in the gain material do not effectively overlap. Providing the resonator modes at separate beam path spots means that the resonator modes do not couple (interact) with each other or a coupling of resonator modes is so weak that the laser pulse sequences do not influence each other, in particular do not mutually influence the repetition frequencies thereof (negligible coupling). In particular, the beam path spots are separated such that there is no cross-mode lock between laser pulse sequences created in the different laser resonators. The resonator modes are determined in particular by the resonator geometries and materials within the laser resonators. The mutual displacement of the resonator modes can be set e. g. as a result of numerical simulations of the laser resonator device configuration and/or by practical tests, including monitoring the created frequency combs. If, according to an advantageous embodiment of the invention, the laser resonators share not only the laser gain medium, but also a Kerr medium, the resonator modes of the laser resonators are also displaced relative to each other in the Kerr medium, so that no or negligible coupling between the resonator modes of different laser resonators is obtained. Particular preferred, this is with the bulk gain medium embodiment of the invention (see below).

Furthermore, according to the invention, at least one of the first and further end mirrors is adjustable so that the repetition frequency of at least one of the first and at least one further laser pulse sequences can be set independently from the repetition frequency of the other one of the first and at least one further laser pulse sequences. Accordingly, at least one of the multiple frequency combs can have its repetition rate adjusted independent of others. Preferably, at least one end mirror of each laser resonator is adjustable, so that the repetition frequencies of all laser pulse sequences can be individually adjusted. Particularly preferred, the end mirrors of one or more laser resonators can be actively controlled, for example using a piezo element and a control loop, to further stabilize or adjust the repetition frequencies.

According to a second general aspect of the invention, the above objective is solved by a multiple frequency comb generation method, wherein a first laser pulse sequence representing a first frequency comb and at least one further laser pulse sequence representing at least one further frequency comb are created simultaneously. At least two of the first and at least one further laser pulse sequences are created with different repetition frequencies. The multiple frequency comb generation method comprises the steps of providing a laser resonator device with multiple resonator mirrors including a laser gain medium being arranged in the laser resonator device and including first end mirrors of a first laser resonator, creating the first and at least one further laser pulse sequences by pumping a laser gain medium with a pump device and passive mode-locking.

According to the invention, the resonator mirrors of the laser resonator device include further end mirrors of at least one further laser resonator, wherein the first laser resonator and the at least one further laser resonator share the laser gain medium. Resonator modes of the first laser resonator and the at least one further laser resonator are displaced relative to each other, so that they are located in the laser gain medium at separate beam path spots. At least one of the first and further end mirrors is adjusted so that the repetition frequency of at least one of the first and at least one further laser pulse sequences can be set independently from the repetition frequency of the other one of the first and at least one further laser pulse sequences.

Preferably, at least two of the resonator mirrors comprise chirped mirrors which are capable of dispersion control within the laser resonator device. In contrast to prism pairs used e. g. in [9] for dispersion control, chirped mirrors have the following particular advantages. They provide tailored dispersion, so that shorter laser pulses with broader spectrum—important for spectroscopic applications—can be created with the multiple frequency combs.

Further preferred, the multiple frequency comb generation method is conducted with the multiple frequency comb source apparatus of the first general aspect of the invention.

In contrast to the dual frequency comb of e. g. [7] or [8], the two or more laser resonators of the inventive set-up are built such that they share almost all optical components except for the end mirrors. Thus, the majority of mechanical instability or drifts are shared and canceled out between the laser resonators, such that critical parameters including but not limited to the difference in frequency offset can be preserved. The beam paths of the two or more laser resonators, being in proximity to each other, but having the displaced resonator modes in the gain medium and optionally also in the Kerr medium, will also share similar fluctuations in air flows, ensuring the laser resonators' optical characteristics with respect to one another is preserved.

The laser resonators have separate end mirrors allowing an individual manipulation to adjust at least one laser resonator cavity alignment and cavity length independently. This is in further contrast to the dual frequency comb of [7] or [8], and it allows the repetition frequency of the output radiation, which depends on the resonator length, to be individually adjusted. Since the repetition frequency, together with the difference in repetition frequency between the outputs, are critical parameters for multiple comb spectroscopy, this configuration allows the tailoring of the output to specific applications.

In contrast to the dual color source of [9], the operation of the two or more laser resonators is mutually decoupled by separating the resonator modes, despite of sharing a common gain medium. Thus, different repetition frequencies can be adjusted in a targeted manner with the inventive set-up.

According to preferred applications of the invention, the multiple frequency comb source apparatus provides a dual frequency comb source, i. e. the laser resonator device comprises just two laser resonators being operated with different repetition frequencies, so that two laser pulse sequences (two frequency combs) are generated.

According to a preferred embodiment of the invention, the laser gain medium comprises a thin disc laser medium.

The thin-disc laser medium is a laser crystal shaped as a thin disc. Preferably, the thickness of the thin disc is smaller than the laser beam diameter. With preferred applications, the thin disc laser medium has a thickness in a range from 50 μm to 500 μm. Providing a thin disc laser medium has the particular advantages of creating a large pump spot size in the laser gain medium and supporting high average power output directly from the laser resonator device. Preferably, the thin disc laser medium is made of Yb:YAG, Ho:YAG, Tm:YAG, Ti:Sapphire, Cr:ZnS/ZnSe, or Alexandrite.

According to an alternative advantageous embodiment of the invention, the laser gain medium comprises a bulk gain medium. Employing a bulk gain medium may have advantages in particular in terms of simplicity, availability of a broad variety of gain materials, price, applications with lower power ranges and easier manufacturing.

If, according to a further preferred embodiment of the invention, each of the first and the at least one further laser resonators includes an independent mode-locking device for passive mode-locking, advantages in terms of specifically adapting the mode-locking device to the laser pulse sequence to be created in the respective laser resonator are obtained. Preferably, each laser resonator includes an individual hard aperture being arranged in the beam path of the laser resonator as a spatial mode filter for passive mode-locking. The mode-locking technique preferably used is Kerr-lens mode-locking [11]. Preferably, each laser resonator contains a separate Kerr medium and an independent hard aperture to enable Kerr-lens mode-locking in combination with the Kerr-medium. The Kerr medium is a solid optical component providing the non-linear Kerr effect and being capable of starting and maintaining the Kerr-lens mode-locking when the gain medium is pumped with the pump device.

With an alternative embodiment, the first and the at least one further laser resonators may share a common mode-locking device, in particular a common Kerr medium, being adapted for passive mode-locking. Thus, the beam paths of all laser resonators transmit through the same Kerr medium, resulting in advantages in terms of a compact device configuration and nearly the same beam paths, implying nearly the same fluctuations caused by the air and mechanical components and resulting in better mutual stability.

When employing the common mode-locking device, the laser resonators and the mode-locking device preferably are configured such that the resonator modes of all laser resonators are mutually displaced in the mode-locking device, in particular the common Kerr medium. Advantageously, different portions of the mode-locking device are used for mode locking, thus reducing the risk of damages of the mode-locking device and improving a thermal management thereof.

According to a further advantageous embodiment of the invention, the pump device comprises an optical pump source being arranged for creating pump laser radiation and irradiating the laser gain medium. The cavities of the first and the at least one further laser resonator are pumped by pump light preferably originating from the same pump device, such that any intensity fluctuations of the pump device will be shared. Preferably, one single pump beam path is provided between the pump device and the laser gain medium. The optical pump source and the pump beam path thereof are arranged for irradiating the laser gain medium with a single pump beam with an excitation spot size in the gain medium covering the resonator modes of all laser resonators. Preferably, a pump spot with a larger area is used to simultaneously accommodate two or more smaller cavity spots, without the cavity spots effectively overlapping with one another. This ensures the pump light of the laser resonators to travel through almost the same paths, while avoiding crosstalk between the two or more resonator beams.

In an alternative configuration, the pump beam is split with a beam splitter into two or more pump beams which are separately focused onto the laser gain material. This variant advantageously enables flexible matching of the pump spot size to the two or more beams.

According to a further advantageous embodiment of the invention, the pump device comprises an electrical pump source being arranged for electrically pumping the laser gain medium. With this variant of the invention, wherein the laser gain medium preferably is a semiconductor gain medium, advantages in terms of a more compact setup are obtained. Furthermore, the passive mode-locking is facilitated by a Kerr lens or SESAM.

Further advantages are obtained in particular for spectroscopy applications of the multiple frequency comb source apparatus, if it includes a carrier envelope frequency (CEO) stabilization device for CEO stabilizing of at least one of the multiple frequency combs. With a preferred variant, the CEO stabilization device can be adapted for a relative CEO stabilization, i. e. for stabilizing a CEO difference between two of the multiple frequency combs.

According to a particularly preferred embodiment of the invention, the multiple frequency comb source apparatus includes a control device for actively controlling the at least one of the first and the further end mirrors, preferably at least one end mirror of each laser resonator, to influence pulse coincidence between two of the first laser pulse sequence and the at least one further laser pulse sequence and/or to further stabilize and/or adjust the repetition frequencies of the first frequency comb and the at least one further frequency comb. The control device comprises a detector arrangement sensing pulse properties of at least two laser pulse sequences and an adjustment device, like piezo actors, setting the end mirror(s) in dependency on an output signal of the detector arrangement. Advantageously, the control device allows an improved adaptation of the frequency combs (such as increase in the acquisition rate) to the practical application thereof.

It is noted that the control device for actively controlling the end mirror(s) is an optional feature of the invention. Even without the active control, a sufficient temporal stability of the system as well as a sufficient mutual coherence time between the two or more laser resonators can be obtained.

If, according to a further variant of the invention, one of the first end mirrors is a first output coupler mirror and at least one of the further end mirrors is at least one further output coupler mirror, output coupling out of the laser resonators can be facilitated. The respective end mirrors fulfill a double function in terms of providing the resonator cavity and passing a portion of the laser pulses circulating in the cavity.

Particularly preferred, the first and the at least one further output coupler mirrors of different laser resonators may have different transmission values. Accordingly, the frequency combs can be created with different power, as it is employed for special detection techniques, like electro-optic sampling, and/or for subsequent light conversion processes. For example, a nonlinear conversion device can be arranged for converting fundamental radiation of at least one of the multiple frequency combs into another spectral range, in particular XUV, UV and/or infrared ranges.

According to a third general aspect of the invention, the above objective is solved by a combination of the multiple frequency comb source apparatus according to the above first general aspect of the invention with a heterodyne detection apparatus, in particular by a spectroscopy apparatus comprising the multiple frequency comb source apparatus according to the above first general aspect of the invention, being configured for creating frequency combs with different repetition frequencies, an interferometer device being configured for accommodating a sample and for creating an interferogram by superimposing the frequency combs, and a data acquisition device being configured for detecting the interferogram and for a Fourier transformation of the detected interferogram for providing spectral transmission properties of a sample According to a fourth general aspect of the invention, the above objective is solved by a spectroscopic measuring method, comprising the steps of creating frequency combs with different repetition frequencies with a method according to the above second general aspect of the invention, coupling the frequency combs interferometer arms of an interferometer device, arranging a sample to be investigated in one of the interferometer arms, detecting an interferogram of light traveling along the first and second interferometer arms, and Fourier transformation of the detected interferogram for providing spectral transmission properties of the sample.

BRIEF DESCRIPTION OF THE DRAWINGS

Further details and advantages of the invention are described in the following with reference to the attached drawings, which schematically show in.

PREFERRED EMBODIMENTS OF THE INVENTION

Preferred embodiments of the invention are described in the following with exemplary reference to a dual or three frequency comb source. It is emphasized that the implementation of the invention is not restricted to these examples, but also is possible with creating four, five or more, e. g. up to ten frequency combs. The embodiments are described in particular with reference to the configuration of the pump source, laser resonators and gain medium. Details of the system components, like the election of materials and geometric parameters, and the operation thereof are not described as far as they are known as such from conventional passively mode-locked laser resonators for creating laser pulse sequences, in particular from conventional single frequency combs. The frequency combs are created with different repetition frequencies. The absolute repetition frequencies and the difference thereof is selected in dependency on the application of the frequency combs. For example, for an infrared spectroscopy applications, the difference of the repetition frequencies is selected depending on the desired resolution and bandwidth.

In the figures, the two or more beams of circulating laser pulses are shown separated in a tangential plane to simplify the illustration. In practice, the beams preferably are spatially separated in a sagittal plane.

Figure 1:
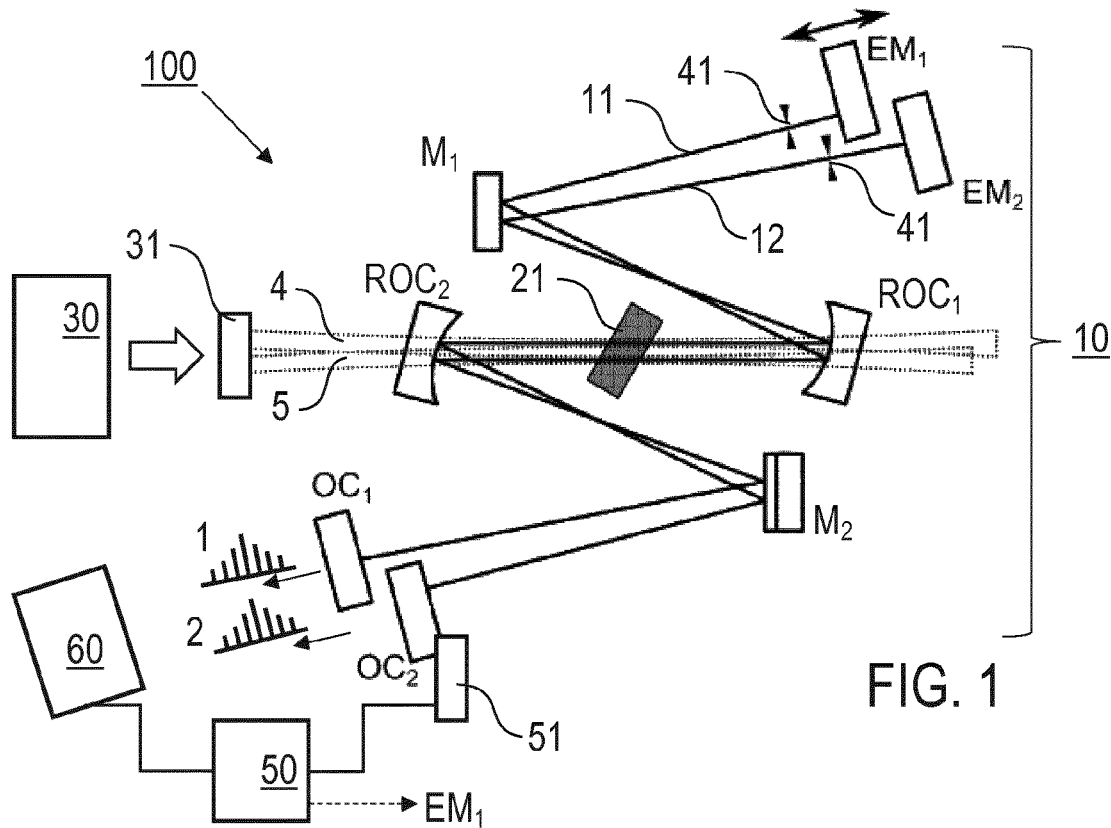
FIG. 1: a preferred embodiment of the invention, employing separate pump beams for pumping a bulk laser medium.

FIG. 1 shows a first embodiment of the inventive multiple frequency comb source apparatus 100, including a laser resonator device 10 with a first laser resonator 11 and a second laser resonator 12, a laser gain medium provided by a bulk gain medium 21, a pump device 30 being provided with a beam splitter 31, a control device and a detector device 60.

The first laser resonator 11 is provided by a plane first end mirror $EM_1$, a plane first deflection mirror $M_1$, a concave first focusing mirror $ROC_1$, a concave second focusing mirror $ROC_2$, a plane second deflection mirror $M_2$ and a plane first output coupler mirror $OC_1$. The second laser resonator 11 is provided by a plane second end mirror $EM_2$, the first deflection mirror $M_1$, the first focusing mirror $ROC_1$, the second focusing mirror $ROC_2$, the second deflection mirror $M_2$ and a plane second output coupler mirror $OC_2$. The first and second deflection mirrors $M_1$ and $M_2$ comprise of either plane high-reflection mirrors, or plane chirped-mirrors being designed for a dispersion control within the laser resonators 11, 12. As mentioned above, the set-up of FIG. 1 represent an example. In particular the number and location of the chirped mirrors can change, and/or the mirrors $EM_1$ or $EM_2$ can be used as output couplers.

Each section of the laser resonators 11, 12 adjacent to the first and second end mirror $EM_1$, $EM_2$ includes an adjustable hard aperture 41 providing a spatial filter for passive mode-locking within the laser resonators 11, 12. Except of the end and output coupler mirrors and the hard apertures, both laser resonators 11, 12 share the same optical components. Preferably, the beam paths of both laser resonator 11, 12 are arranged in a common plane. Alternatively, they can be arranged in planes tilted relative to each other.

Figure 4:
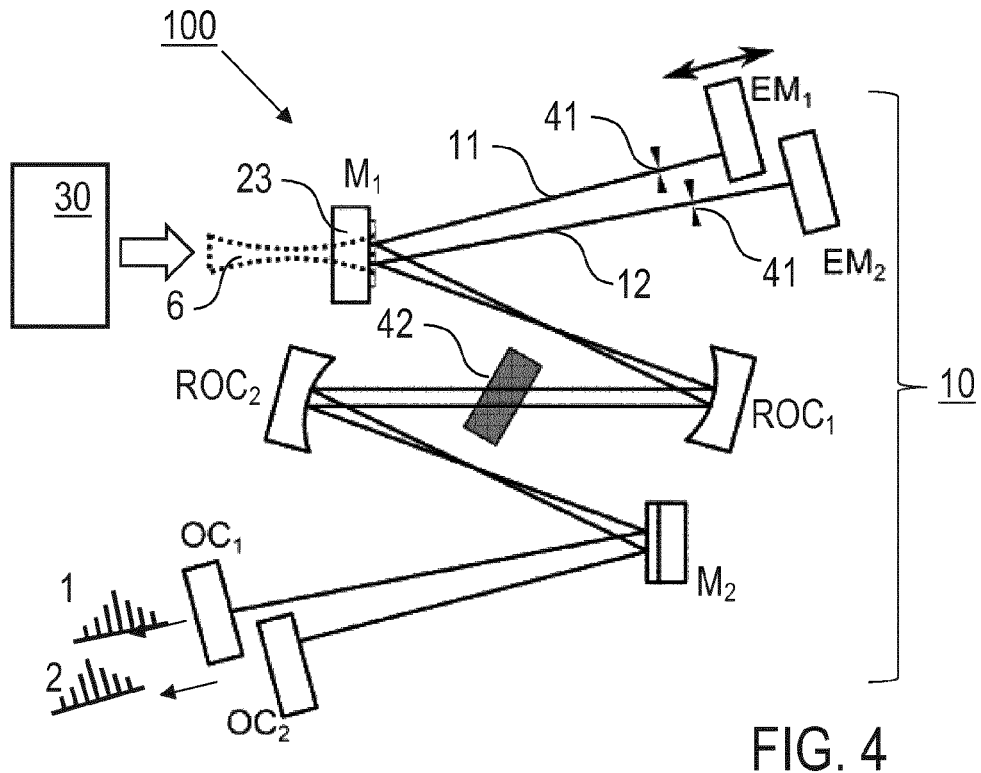
FIG. 4: a further embodiment of the invention, employing a single pump beam for pumping a thin disc laser medium.

The bulk gain medium 21 is e. g. a laser crystal with a length of 1 to 15 mm along the longitudinal beam direction, e. g. 9 mm, being arranged in a common focal plane of the first and second focusing mirrors $ROC_1$, $ROC_2$. The bulk gain medium 21 is arranged with a tilted configuration relative to the beam paths of the laser resonators 11, 12, preferably with the Brewster angle relative to a centered axis between both beam paths. Alternatively, the gain medium crystal (and/or a separate Kerr medium, see e. g. FIG. 4 below) can have an antireflective coating (AR coating) and can be placed perpendicular to the beam path.

The pump device 30 comprises e. g. a solid-state diode laser, like a InP laser, with an output power of 2 W to 40 W, e. g. 5 W, at a pump wavelength within the absorption band of the laser crystal, e.g. of about 1650 nm for Cr:ZnS laser crystals. The beam splitter 31, optionally combined with a focusing and/or deflection optic, creates two pump beams 4, 5 being directed into the bulk gain medium 21. The pump beams 4, 5 are tilted relative to a plane accommodating the first and second concave focusing mirrors $ROC_1$, $ROC_2$, thus avoiding a disruption by the focusing mirrors. Alternatively, with an appropriate election of materials and wavelengths, the pump beams 4, 5 can pass the focusing mirrors. The pump beams 4, 5 may overlap in the bulk gain medium 21, or they can be displaced relative to each other. The pump beams 4, 5 are adjusted such that they cover separate locations of resonators modes of the first and second laser resonators 11, 12 within the bulk gain medium 21.

The detector device 60 include e. g. photodiodes coupled with frequency counters or other frequency measuring devices (see FIG. 5) for detecting the repetition frequencies of the frequency combs 1, 2 created by the first and second laser resonators 11, 12. The detector device 60 is connected with the control device 50, which is coupled with a piezo actor 51 for loop control by translating one of the output coupler mirror, e. g. $OC_2$ and/or one of the end mirrors, e. g. $EM_1$. The control device 50 can be provided for further control and/or setting functions, e. g adjusting the positions of the hard apertures 41 or controlling the operation of the pump source 30. The detector device 60 is an optional feature of the invention. It can be omitted, if the temporal stability of the multiple frequency comb source apparatus 100 is sufficient for a particular application, e.g. a spectroscopic measurement.

Alternatively or additionally, the detector device 60 and the control device 50 may be configured as a CEO stabilization device, stabilizing the absolute CEO of the frequency combs 1, 2 or the relative CEO of the frequency combs 1, 2.

In operation for dual frequency comb generation, the laser resonator device 10 creates a first and a second laser pulse sequence, each providing one of the frequency combs 1, 2 by pumping and passively mode-locking the bulk gain medium 21. Laser pulses circulating in the first and second laser resonators 11, 12 are coupled out of the multiple frequency comb source apparatus 100 via the first and second semi-transmissive output coupler mirror $OC_1$, $OC_2$.

Figure 2:
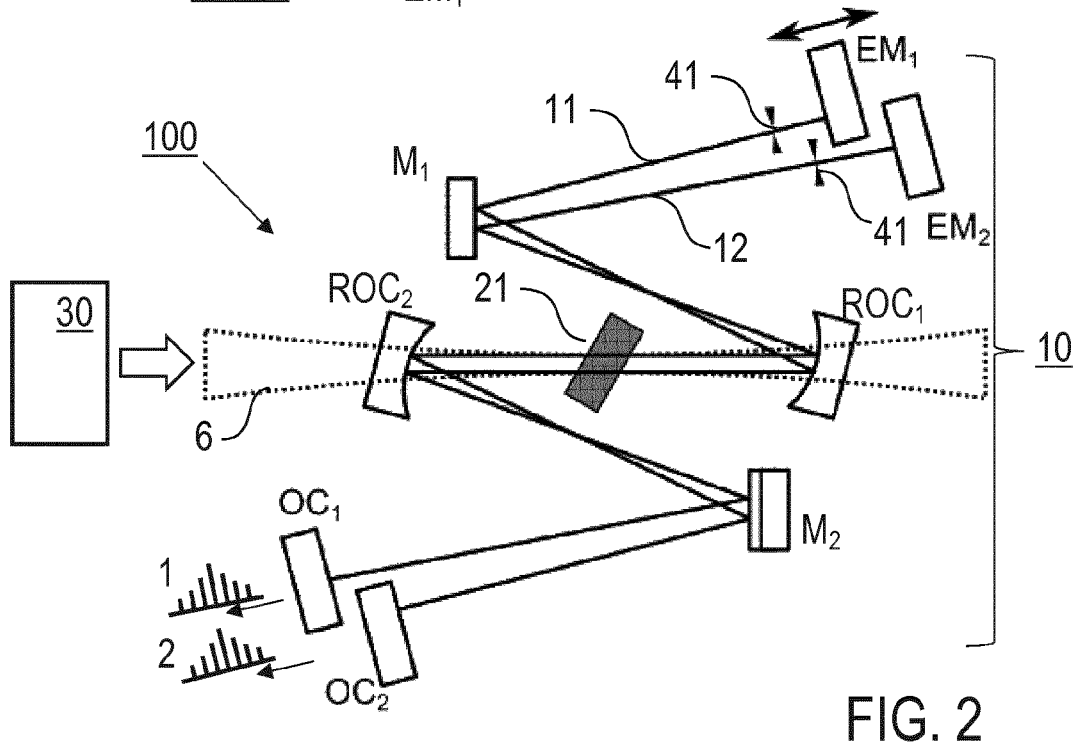
FIG. 2: an alternative embodiment of the invention, employing a single pump beam for pumping a bulk laser medium

FIG. 2 shows a second embodiment of the inventive multiple frequency comb source apparatus 100, including the laser resonator device 10 with the first laser resonator 11 and the second laser resonator 12, and including the bulk gain medium 21, wherein the devices 50, 60 are not shown. These components and in particular the mirrors of the laser resonator device 10 are provided as described above with reference to FIG. 1. Contrary to the first embodiment, the pump device 30 creates a single pump beam 6 being focused into the bulk gain medium 21. The pump beam 6 irradiates a portion of the bulk gain medium 21 including the separated resonator modes of both laser resonators 11 and 12.

Figure 3:
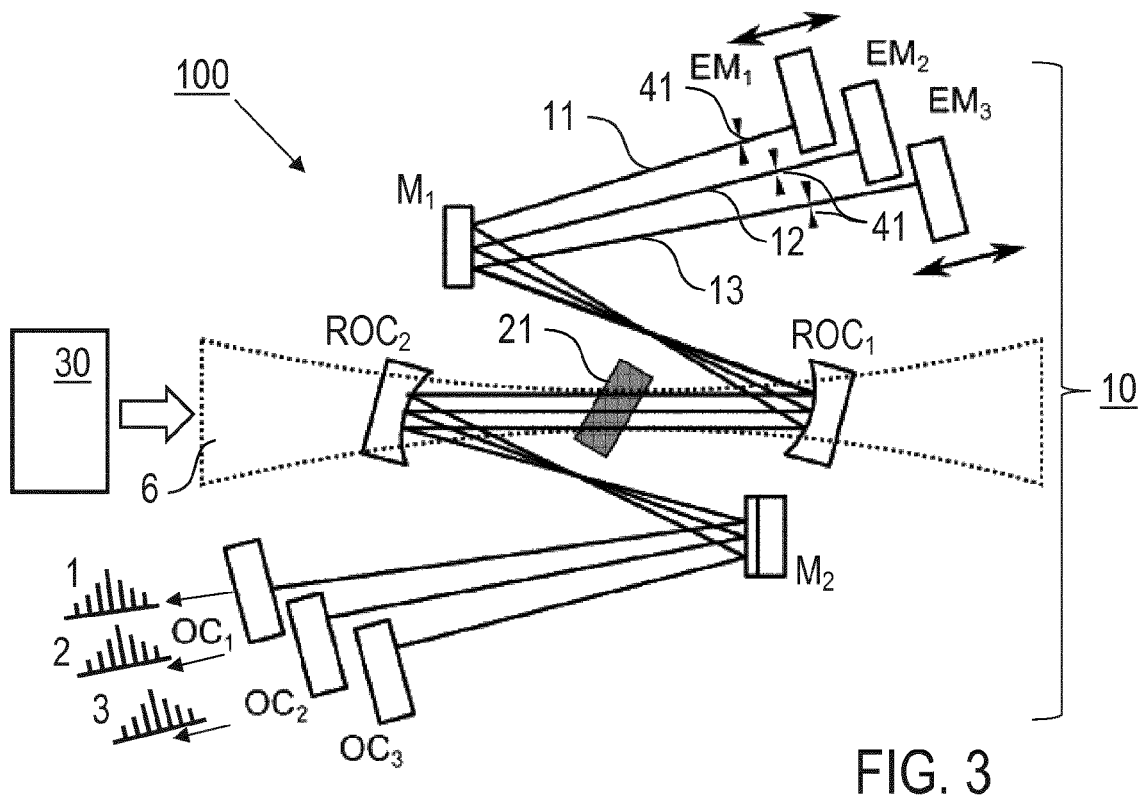
FIG. 3: a variant of the embodiment of FIG. 2 extended to the generation of three frequency combs.

A third embodiment of the inventive multiple frequency comb source apparatus 100 is shown in FIG. 3, wherein the laser resonator device 10 includes three laser resonators. Additionally to the first and second laser resonators 11, 12, a third laser resonator 13 is provided by a third end mirror $EM_3$, the first deflection mirror $M_1$, the first focusing mirror $ROC_1$, the second focusing mirror $ROC_2$, the second deflection mirror $M_2$ and a third output coupler mirror $OC_3$. In this case, three resonator modes pass the bulk gain medium 21 with a mutual displacement. At least one of the end mirrors and/or the output coupler mirrors is adjustable by piezo actuators (not shown, see double arrows) for setting the repetition frequency in the related laser resonator.

In operation for generating three frequency combs 1, 2 and 3, the laser resonator device 10 creates a first, a second and a third laser pulse sequence, each providing one of the frequency combs 1, 2 and 3 by pumping and passively mode-locking the bulk gain medium 21. Laser pulses circulating in the laser resonators 11, 12 and 13 are coupled out of the multiple frequency comb source apparatus 100 via the first and second semi-transmissive output coupler mirror $OC_1$, $OC_2$ and $OC_3$.

While FIGS. 1 to 3 show embodiments of the invention employing a bulk gain medium 21, FIG. 4 illustrates a preferred embodiment, wherein the laser gain medium is a thin disc laser medium 22. One of the deflection mirrors ($M_1$), which is shared by both laser resonators 11, 12 is provided by the thin disc laser medium 22 being arranged on a carrier 23. The pump beam 6 preferably is incident on the front side of the thin-disk crystal. Alternatively, the carrier 23 can be transparent for the wavelength of the pump beam 6 for a back-side illumination (as shown for illustrative purposes in the figure). A single pump beam 6 (as shown) or separate pump beams are created with the pump device 30 and directed into the thin disc laser medium 22 so that a portion thereof is pumped covering all resonator modes within the thin disc laser medium 22. For example, the diameter of the pump beam 6 is adjusted by defocusing the pump beam 6, e. g. with a diameter preferably from 1 mm to 15 mm, e. g. 3 mm, on the thin disc laser medium 22. The mutually separated resonator modes of the laser resonators 11, 12 have a diameter of preferably 800 µm to 12 mm, e. g. 2.4 mm on the thin disc laser medium 22. As an example, the separated resonator modes have a diameter of about 80% of the pump spot diameter.

Passive mode-locking is obtained by providing a mode-locking device 40 with a Kerr medium 42, e. g. a sapphire plate with a thickness of preferably 0.5 mm to 20 mm, like 1 mm to 3 mm, e. g. 1 mm, between the first and second concave focusing mirrors $ROC_1$, $ROC_2$ and the hard apertures 41 in the separate resonator sections adjacent to the first and second end mirror $EM_1$, $EM_2$. With this embodiment, dual frequency comb generation is obtained by pumping and passively mode-locking the thin disc laser medium 22. As in FIG. 1, laser pulses circulating in the first and second laser resonators 11, 12 are coupled out of the multiple frequency comb source apparatus 100 via the first and second semi-transmissive output coupler mirror $OC_1$, $OC_2$, thus providing the frequency combs 1, 2.

Figure 5:
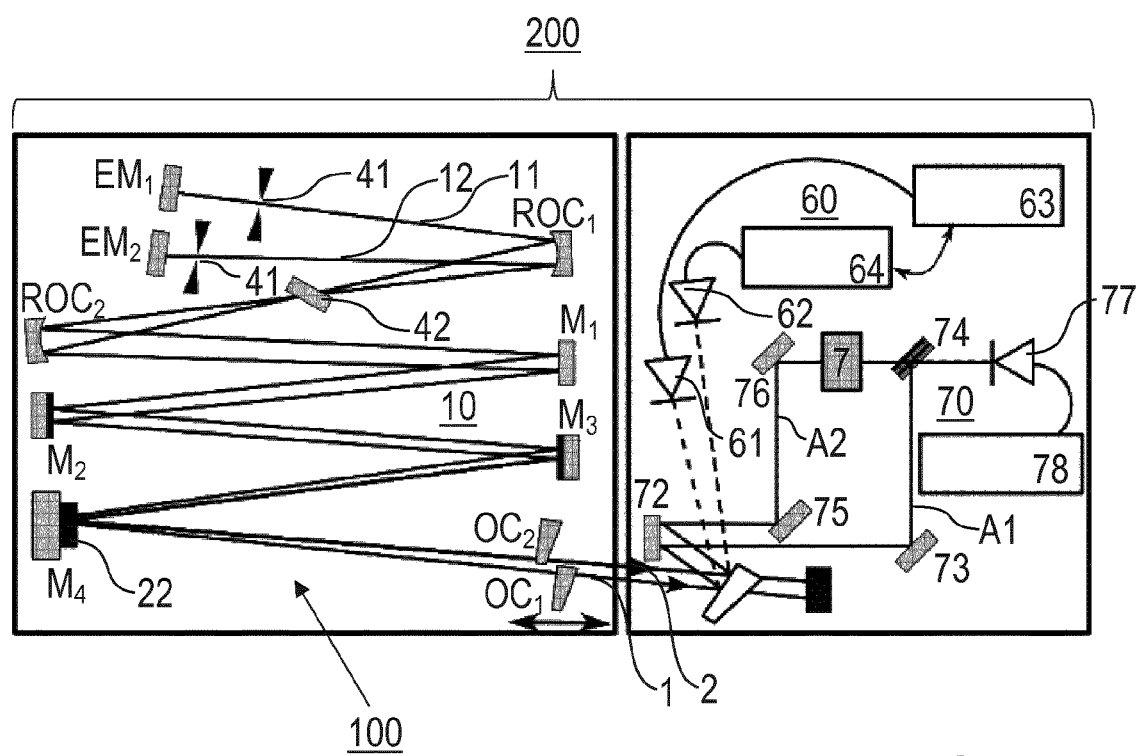
FIG. 5: further details of the embodiment of FIG. 4 in combination with a heterodyne detection of frequency combs.

FIG. 5 shows a variant of the embodiment of FIG. 4 with further details of the multiple frequency comb source apparatus 100 and in combination with a detector device 60 for diagnostic and/or control purposes and an interferometer device 70 for spectroscopy applications. In practical applications of the invention, the interferometer device 70 can be replaced by another optical setup employing the frequency combs and/or the detector device 60 can be omitted. In particular, the set-up can be extended by using more than two frequency combs. The set-up of FIG. 5 represents an embodiment of a spectroscopy apparatus 200 of the invention.

The multiple frequency comb source apparatus 100 (here: dual frequency comb) is operated on the basis of two Kerr lens mode-locked (KLM) thin-disc Yb:YAG oscillators provided by the laser resonators 11 and 12. A solid-state diode laser is used as a pump source (not shown), delivering approximately 240 W of average power at 940 nm. Two D-shaped end mirrors $EM_1$ and $EM_2$ and output coupler mirror $OC_1$, $OC_2$ are utilized to enable independent alignment of the two simultaneously lasing modes (laser beams). These beams share the rest of the intracavity optics including the pump spot on the thin disc laser medium 22.

The first and second concave focusing mirrors $ROC_1$, $ROC_2$ (radius of curvature ROC—300 mm) provide a focusing arrangement (telescope), wherein a 3 mm thin sapphire plate is placed in the telescope focus at Brewster angle as a Kerr-medium 42. Even though the beams are spatially separated, it is possible to use the same Kerr-medium for mode locking of both oscillators. A pair of highly dispersive deflection mirrors $M_2$, $M_3$ is implemented in the long arm of the laser resonator device 10 with GDD of −3000 fs² per bounce, resulting in −12 000 fs² total intracavity dispersion per round-trip. To mode lock both oscillator modes independently, two hard apertures 41 are introduced into the cavity. Each aperture 41 has a separate holder, which is placed on an X-Y translation stage (not shown). Control of the $\Delta f_{rep}$ in the current setup is performed by translating one of the output coupler mirror $OC_1$, $OC_2$ mounted on a translation stage (see double arrow, translation stage not shown). The alignment procedure is conducted like in conventional KLM thin-disc oscillators, wherein and both laser resonators 11, 12 can be simultaneously mode-locked. Mode-locking is started e. g. by means of manual displacement of one of the focusing mirrors $ROC_1$, $ROC_2$.

The detector device 60 comprises two photodiodes 61, 62 detecting the frequency combs 1, 2 and being coupled with a frequency measuring device, like a frequency counters 63, 64 (e. g. Keysight 53220A). An output signal of at least one of the frequency counters 63, 64 can be used for adjusting at least one of the output coupler mirrors $OC_1$, $OC_2$. The interferometer device 70 comprises an interferometer 71 with a first arm A1 spanned by the plane mirrors 72, 73 and 74 and a second arm A2 spanned by the plane mirrors 72, 75, 76 and 74. The first and second frequency combs 1, 2 are reflected to the first and second interferometer arms, resp. Mirror 74 is a semi-reflective mirror superimposing the light traveling along the interferometer arms and directing the superimposed light to a sensor, like a photodiode 77. Photodiode 77 is connected with a data acquisition device 78, including a Fourier transform (FT) unit. With the data acquisition device 78, interferograms are collected which result from the mutually different repetition rates of the frequency combs 1, 2. Contrary to conventional FTIR spectrometers, the interferograms are created without any mechanically moved mirror or delay line. By providing a sample 7 in one of the interferometer arms and Fourier transformation of the collected interferograms, spectroscopic information on the sample can be collected like in a conventional FTIR spectrometer.

The inventors have experimentally tested in particular the embodiment of FIG. 5 by measuring spectra of the laser pulses, the temporal stability and a test sample as follows. The resulting characteristics of the dual frequency comb output, such as the average powers and the output spectra in every beam were very similar. Since the two laser pulse sequences share the same intracavity optics and the pump spot on the thin disc laser medium 22, they experience almost the same disturbances, which improves the mutual coherency between them.

In particular, the spectra of the both frequency combs 1, 2 measured with an optical spectrum analyzer (OSA) yielded nearly same spectral shapes and widths. Both spectra centered at 1030 nm. The output laser pulses have 299 fs and 305 fs duration. Slight differences between the spectra can arise from the fact that the optical axes are not identical resulting in the different incidence angles on the first focusing mirror $ROC_1$ and Kerr medium 42, and the different beam positions on the thin disc laser medium 22 can also result in a slight gain difference between the two lasing resonator modes. However, these differences are so weak that they are neglectable with applications of the frequency combs, e. g. in spectroscopy.

The temporal stability of the comb characteristics has been shown by measuring the time evolution of the repetition frequencies (about 61 MHz) of the two laser resonators 11, 12 and the difference in the repetition frequencies thereof. Without any complex stabilization techniques, the passive stability of the difference in repetition frequencies was measured to be around 0.1 Hz over 60 s. This value is sufficient for most of the experiments involving dual frequency combs.

Furthermore, spectroscopic measurement with an artificial sample 7, comprising a home-built Fabry-Pérot etalon with a free spectral range of 120 GHz and an FWHM of the transmission line of 12 GHz. The measured spectrum obtained with the interferometer device 70 of FIG. 5 clearly yields visible transmission Fabry-Pérot lines of the artificial sample 7.

The embodiment of FIG. 5 allows performing molecular spectroscopy. The output of the system can be spectrally broadened in a photonic crystal fiber or in a multipass bulk cell. The spectrally broadened and temporally compressed pulses can then be used for the generation of infrared radiation in a LGS crystal by means of DFG. This method would provide a CEP stable infrared frequency comb, which would drastically simplify the complexity of the setup and the molecular spectroscopy measurements.

The features of the invention disclosed in the above description, the drawings and the claims can be of significance individually, in combination or sub-combination for the implementation of the invention in its different embodiments.

The invention claimed is:

1. A multiple frequency comb source apparatus, being configured for simultaneously creating a first laser pulse sequence representing a first frequency comb and at least one further laser pulse sequence representing at least one further frequency comb, wherein at least two of the first and at least one further pulse sequences have different repetition frequencies, comprising
   a laser resonator device-comprising multiple resonator mirrors including first end mirrors ($EM_1$, $OC_1$) providing a first laser resonator,
   a laser gain medium being arranged in the laser resonator device, and
   a pump device being arranged for pumping the laser gain medium, wherein
   the laser resonator device is configured for creating the first and at least one further laser pulse sequences by pumping and passively mode-locking the laser gain medium, wherein
   the resonator mirrors of the laser resonator device include further end mirrors providing at least one further laser resonator, wherein
   the first laser resonator and the at least one further laser resonator share the laser gain medium,
   resonator modes of the first laser resonator and the at least one further laser resonator are displaced relative to each other, wherein the resonator modes are located in the laser gain medium at separate beam path spots, and
   at least one of the first and further end mirrors is adjustable so that the repetition frequency of at least one of the first and at least one further laser pulse sequences can be set independently from the repetition frequency of the other one of the first and at least one further laser pulse sequences.

2. The multiple frequency comb source apparatus according to claim 1, wherein
   the laser gain medium comprises a thin disc laser medium.

3. The multiple frequency comb source apparatus according to claim 2, wherein
   the thin disc laser medium is made of Yb:YAG, Ho:YAG, Tm:YAG, Ti:Sapphire, Cr:ZnS/ZnSe, or Alexandrite.

4. The multiple frequency comb source apparatus according to claim 2, wherein
   the thin disc laser medium has a thickness in a range from 50 μm to 500 μm.

5. The multiple frequency comb source apparatus according to claim 1, wherein
   the laser gain medium comprises a bulk gain medium.

6. The multiple frequency comb source apparatus according to claim 1, wherein
   each of the first and the at least one further laser resonators includes an independent mode-locking device being arranged for passive mode-locking.

7. The multiple frequency comb source apparatus according to claim 1, wherein
   the first and the at least one further laser resonators share a common mode-locking device being arranged for passive mode-locking.

8. The multiple frequency comb source apparatus according to claim 7, wherein
   the first and the at least one further laser resonators share one single Kerr medium as the common mode-locking device providing a common Kerr-lens mode-locking device.

9. The multiple frequency comb source apparatus according to claim 7, wherein
   the common mode-locking device is arranged such that the resonator modes of the first laser resonator and the at least one further laser resonator are mutually displaced in the common mode-locking device.

10. The multiple frequency comb source apparatus according to claim 1, wherein
    each of the first and the at least one further laser resonators includes an independent hard aperture being configured as a spatial mode filter for passive mode-locking.

11. The multiple frequency comb source apparatus according to claim 1, wherein
    the pump device comprises an optical pump source being arranged for creating pump laser radiation and irradiating the laser gain medium.

12. The multiple frequency comb source apparatus according to claim 11, wherein
    the optical pump source includes a beam splitter being arranged for splitting the pump laser radiation into two pump beams being separately focused onto the laser gain medium.

13. The multiple frequency comb source apparatus according to claim 11, wherein
    the optical pump source is arranged for irradiating the laser gain medium with a single pump beam with an excitation spot size in the laser gain medium covering the resonator modes of the first laser resonator and the at least one further laser resonator in the laser gain medium.

14. The multiple frequency comb source apparatus according to claim 1, wherein
    the pump device comprises an electrical pump source being arranged for electrically pumping the laser gain medium.

15. The multiple frequency comb source apparatus according to claim 1, comprising
    a carrier envelope frequency stabilization device being configured for CEO stabilizing of at least one of the first frequency comb and at least one further frequency comb.

16. The multiple frequency comb source apparatus according to claim 15, wherein the CEO stabilization device is configured for stabilizing a CEO difference between two of the first frequency comb and at least one further frequency comb.

17. The multiple frequency comb source apparatus according to claim 1, further comprising
a control device being arranged for actively controlling the at least one of the first and the further end mirrors for at least one of influencing pulse coincidence between two of the first laser pulse sequence and the at least one further laser pulse sequence, further stabilizing the repetition frequencies of the first frequency comb and the at least one further frequency comb and adjusting the repetition frequencies of the first frequency comb and the at least one further frequency comb.

18. The multiple frequency comb source apparatus according to claim 1, wherein
one of the first end mirrors is a first output coupler mirror and at least one of the further end mirrors is at least one further output coupler mirror.

19. The multiple frequency comb source apparatus according to claim 18, wherein
the first and the at least one further output coupler mirrors have different transmission values.

20. The multiple frequency comb source apparatus according to claim 1, further comprising
a nonlinear conversion device being configured for converting fundamental radiation of at least one of the first frequency comb and the at least one further frequency comb into different spectral ranges.

21. The multiple frequency comb source apparatus according to claim 1, comprising the first laser resonator and a second laser resonator and being configured as a dual frequency comb source.

22. A spectroscopy apparatus, comprising:
a multiple frequency comb source apparatus according to claim 1, being configured for simultaneously creating two frequency combs with different repetition frequencies,
an interferometer device comprising a first and a second interferometer arm and being configured for creating an interferogram of light travelling along the first and second interferometer arms, wherein the interferometer device is arranged for coupling each one of the frequency combs correspondingly to one of the interferometer arms, and arranging a sample to be investigated in one of the interferometer arms, and
a data acquisition device being arranged for detecting the interferogram and a Fourier transformation of the detected interferogram for providing spectral transmission properties of the sample.

23. A multiple frequency comb generation method, including simultaneously creating a first laser pulse sequence representing a first frequency comb and at least one further laser pulse sequence representing at least one further frequency comb, wherein at least two of the first and at least one further laser pulse sequences have different repetition frequencies, comprising the steps of
providing a laser resonator device comprising multiple resonator mirrors including first end mirrors providing a first laser resonator and a laser gain medium being arranged in the laser resonator device, and
creating the first and at least one further laser pulse sequences by pumping a laser gain medium with a pump device and passive mode-locking, wherein
the resonator mirrors of the laser resonator device include further end mirrors providing at least one further laser resonator, wherein the first laser resonator and the at least one further laser resonator share the laser gain medium,
resonator modes of the first laser resonator and the at least one further laser resonator are displaced relative to each other, wherein the resonator modes are located in the laser gain medium at separate beam path spots, and
at least one of the first and further end mirrors is adjusted so that the repetition frequency of at least one of the first and at least one further laser pulse sequences can be set independently from the repetition frequency of the other one of the first and at least one further laser pulse sequences.

24. The multiple frequency comb generation method according to claim 23, wherein
the laser gain medium comprises a thin disc laser medium or a bulk gain medium.

25. The multiple frequency comb generation method according to claim 23, wherein
passive mode-locking is introduced by two independent mode-locking devices being arranged in each of the first laser resonator and the at least one further laser resonator, respectively.

26. The multiple frequency comb generation method according to claim 23, wherein
passive mode-locking is introduced by a common mode-locking device being shared by the first laser resonator and the at least one further laser resonator.

27. The multiple frequency comb generation method according to claim 26, wherein
passive mode-locking is introduced by one single Kerr medium provided as the common mode-locking device.

28. The multiple frequency comb generation method according to claim 26, wherein
the common mode-locking device is arranged such that the resonator modes of the first laser resonator and the at least one further laser resonator are mutually displaced in the common mode-locking device.

29. The multiple frequency comb generation method according to claim 23, wherein
passive mode-locking is supported by two independent hard apertures being arranged as spatial mode filters in each of the first laser resonator and the at least one further laser resonator, respectively.

30. The multiple frequency comb generation method according to claim 23, wherein
pumping the laser gain medium with the pump device comprises optical pumping, including creating pump laser radiation with an optical pump source and irradiating the laser gain medium.

31. The multiple frequency comb generation method according to claim 30, wherein
the optical pump source includes a beam splitter splitting the pump laser radiation into two pump beams being separately focused onto the laser gain medium.

32. The multiple frequency comb generation method according to claim 30, wherein
the optical pump source device irradiates the laser gain medium with a single pump beam with an excitation spot size in the gain medium covering the resonator modes of the first laser resonator and the at least one further laser resonator in the gain medium.

33. The multiple frequency comb generation method according to claim 23, wherein
pumping the laser gain medium with the pump device comprises electrical pumping the laser gain medium.

34. The multiple frequency comb generation method according to claim 23, further including
 actively controlling the at least one of the first and second end mirrors for at least one of influencing pulse coincidence between two of the first laser pulse sequence and the at least one further laser pulse sequence, further stabilizing the repetition frequencies and adjusting the repetition frequencies.

35. The multiple frequency comb generation method according to claim 23, wherein
 outcoupling the first laser pulse sequence via one of the first end mirrors providing a first output coupler mirror, and
 outcoupling the at least one further laser pulse sequence via at least one of the further end mirrors providing at least one further output coupler mirror.

36. The multiple frequency comb generation method according to claim 35, wherein
 the first and at least one further output coupler mirrors have different transmission values, so that the first and at least one further laser pulse sequences are output with different averaged power.

37. The multiple frequency comb generation method according to claim 23, comprising
 carrier envelope frequency (CEO) stabilizing of at least one of the first frequency comb and at least one further frequency comb.

38. The multiple frequency comb generation method according to claim 37, further including
 stabilizing a CEO difference between two of the first frequency comb and at least one further frequency comb.

39. The multiple frequency comb generation method according to claim 23, further comprising
 converting fundamental radiation of at least one of the first frequency comb and the at least one further frequency comb into different spectral ranges.

40. The multiple frequency comb generation method according to claim 23, wherein two frequency combs are generated.

41. A spectroscopic measuring method, comprising the steps of
 creating two frequency combs with different repetition frequencies, and
 coupling each one of the frequency combs correspondingly to one of a first interferometer arm and a second interferometer arms of an interferometer device and arranging a sample to be investigated in one of the interferometer arms,
 detecting an interferogram of light travelling along the first and second interferometer arms, and
 Fourier transformation of the detected interferogram for providing spectral transmission properties of the sample.

* * * * *